United States Patent [19]

Vail

[11] Patent Number: 5,549,862
[45] Date of Patent: Aug. 27, 1996

[54] METHOD FOR FABRICATING A ONE PIECE COVED BACKSPLASH

[76] Inventor: Donald R. Vail, 8585 Ocean View Rd., Ventura, Calif. 93001

[21] Appl. No.: 509,244

[22] Filed: Jul. 31, 1995

[51] Int. Cl.⁶ .................................................. B29C 53/00
[52] U.S. Cl. .......................... 264/238; 264/138; 264/295; 264/296; 264/322; 264/339; 156/71; 156/211
[58] Field of Search ..................... 264/295, 296, 264/322, 339, 138, 238; 425/384; 156/71, 211

[56] References Cited

U.S. PATENT DOCUMENTS

| | | | |
|---|---|---|---|
| 1,794,158 | 2/1931 | Dieterich | 52/387 |
| 1,872,482 | 8/1932 | Messing | 264/339 |
| 2,307,338 | 1/1943 | Sluyter et al. | 52/288.1 |
| 2,487,494 | 11/1949 | Taber | 264/339 |
| 2,739,636 | 3/1956 | Tyler | 264/322 |
| 2,998,475 | 8/1961 | Grimsinger | 156/211 |
| 3,707,061 | 12/1972 | Collette et al. | 52/288.1 |
| 4,756,863 | 7/1988 | Shofer | 264/295 |
| 5,199,237 | 4/1993 | Juntunen | 52/287.1 |
| 5,330,262 | 7/1994 | Peters | 312/140.4 |

FOREIGN PATENT DOCUMENTS 62-151321   7/1987   Japan ..................... 264/138

Primary Examiner—Jan H. Silbaugh
Assistant Examiner—Vi Duong Dang
Attorney, Agent, or Firm—Irving Keschner

[57] ABSTRACT

A method for forming a coved backsplash system, comprising two adjacent perpendicular wall sections joined by a curved corner joint. In particular, a designed relief, or groove, is formed on the rear surface of the material at a predetermined depth. The grooved material is placed on a shaped mandrel having the capacity of maintaining controlled heating, limited to the area being formed on the material. The grooved area is also heated by a device in conjunction with the surface area being heated by the mandrel. The solid surface material is brought to a thermoforming temperature by conductivity of the heat generated in the mandrel and heating devices. A wiping arm is used to form the solid surface material to the mandrel, the solid surface material being brought in contact with a flat work surface by the wiping arm. The non-grooved, flat surface areas of the material are then held in place by the wiping arm while the solid surface material begins the cooling process. After cooling, the heating devices are retracted, the material returning to its original rigidity. A back up piece is affixed to the solid surface with an adhesive strengthening the area of the thermoforming.

8 Claims, 2 Drawing Sheets

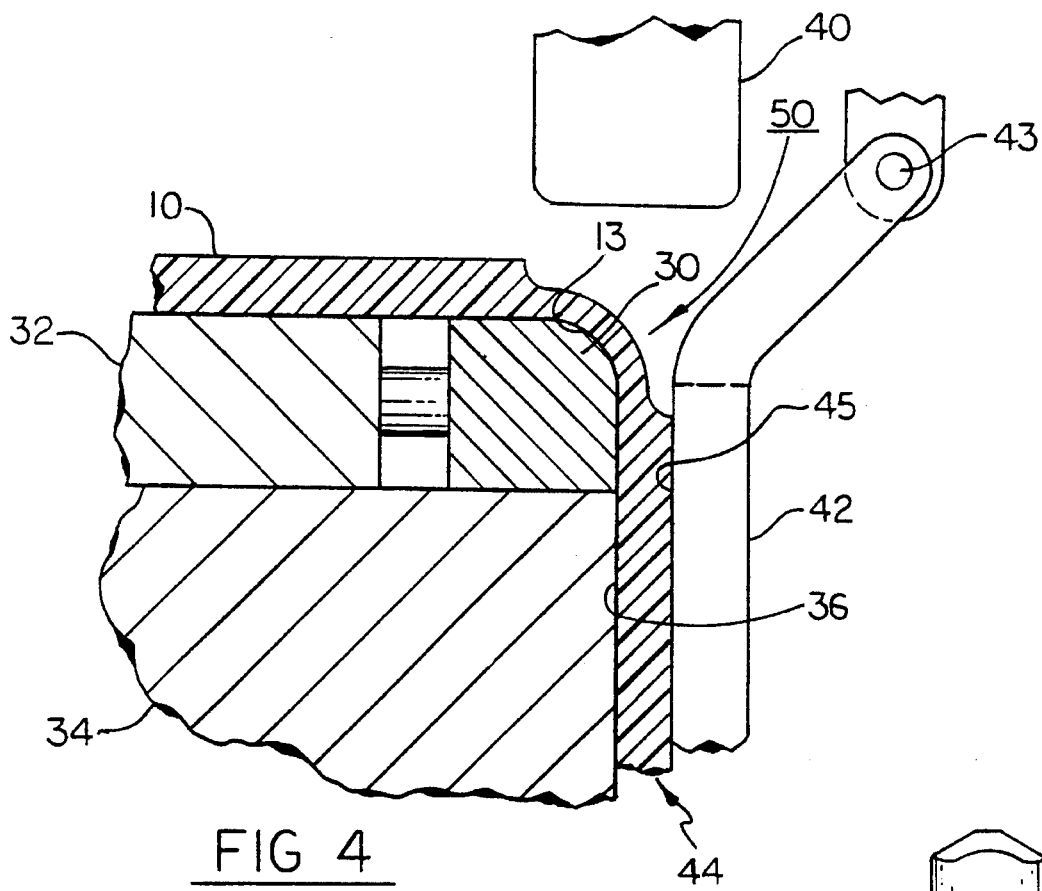
FIG 4
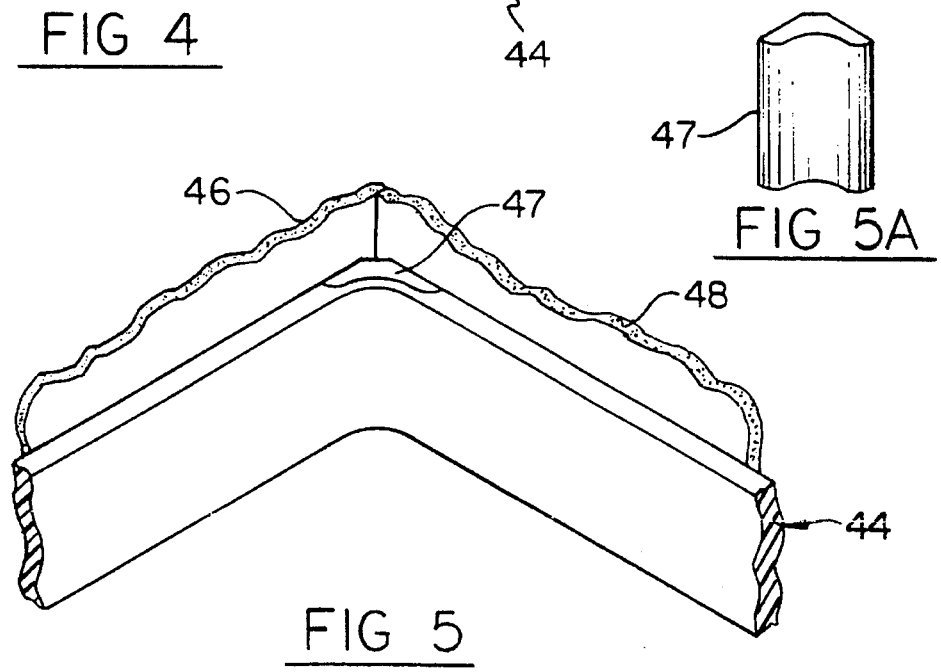
FIG 5A
FIG 5

METHOD FOR FABRICATING A ONE PIECE COVED BACKSPLASH

BACKGROUND OF THE INVENTION

1. Field of the Invention

The present invention provides an improved method for fabricating a coved backsplash utilizing heat forming techniques.

2. Description of the Prior Art

Typical kitchen countertops or decks utilize a backsplash to prevent water or other damage to adjacent walls. In addition, typical backsplashes are coved, or have a separate curved piece which provides an overall pleasing aesthetic effect. In order to provide a curved effect at the intersection of two adjacent backsplash portions, a separate coved piece is typically utilized. Further, in order to secure the backsplash portions to the deck portion of the counter, a pedestal type member is typically formed on the lower edge portion thereof and adapted to fit into an aligned recess. The joint is usually filled with an adhesive to secure the backsplash to the deck.

A number of prior art patents disclose the use of separate components to form a smooth intersecting wall corner. In particular, U.S. Pat. No. 2,307,338 to Sluyter et al discloses an inside corner fitting comprising a pair of angularly disposed portions adapted to fit within such corner as illustrated and terminating at its lower end in a point; U.S. Pat. No. 1,794,158 to Dieterich discloses wall tiles having interfitting recessed portions; U.S. Pat. No. 3,707,061 to Collette et al discloses an inside molding having dowel pins and a plurality of spring clips for holding the molding in place; U.S. Pat. No. 5,199,237 discloses the use of a receptacle to engage adjacent ends of adjacent lineal moldings; and U.S. Pat. No. 5,330,262 discloses a backsplash having a bottom surface specifically sized and shaped for insertion into a recess formed in a countertop whereby a curved transition is defined between the top horizontal surface of the countertop and the front face of the backsplash.

Another prior art process consists of layering various sized pieces of a polymer solid surface material, typically, Corian®, a solid surface material, a material manufactured by E. I. DuPont de Nemours Company, Wilmington, Del., together and shaping them into a cove. The shaping process is typically done with a base router device. The one piece seamless thermoformed backsplash has not been successful in that the solid surface materials fail to form successfully the tightened radius necessary to produce a useful product.

The techniques described hereinabove to form the coved, or curved, intersection requires either a separate component or a substantial modification of the backsplash itself, all increasing the overall cost of the installation. What is desired is to provide a backsplash and coved portion which can be easily fabricated, thus substantially reducing the installation time and, in turn, reducing the costs of the installation.

SUMMARY OF THE PRESENT INVENTION

The present invention provides a method for forming a coved backsplash system, comprising two adjacent perpendicular wall sections joined by a curved corner joint, in a simple and cost efficient manner. In particular, a designed relief, or groove, is formed on the rear surface of the material at a predetermined depth. The grooved material is placed on a shaped mandrel having the capacity of maintaining controlled heating, limited to the area being formed on the material. The grooved area is also heated by a device in conjunction with the surface area being heated by the mandrel.

The solid surface material is brought to a thermoforming temperature by conductivity of the heat generated in the mandrel and heating devices. A wiping arm is used to form the solid surface material to the mandrel. The solid surface material is brought in contact with a flat work surface by the wiping arm. The non-grooved, flat surface areas of the material are then held in place by a holding device while the solid surface material begins the cooling process. When the wiping arm has finished its movement, the heating devices are retracted to prevent blistering and cracking in the thermoformed area. The thermoformed material is then cooled. When the thermoformed material is cooled sufficiently, it will return to its original rigidity. A back up piece is affixed to the solid surface with an adhesive strengthening the area of the thermoforming.

The present invention thus eliminates the problems involved with thermoforming of tight radius' using Corian, a solid surface material or other polymer solid surfaces, providing a useful product at a substantially reduced cost.

DESCRIPTION OF THE DRAWING

For a better understanding of the invention as well as other objects and further features thereof, reference is made to the following description which is to be read in conjunction with the accompanying drawing wherein:

FIG. 4 illustrates the bending of the material to form the coved backsplash;

FIG. 5 is a partial perspective view illustrating the installed coved backsplash formed in accordance with the teachings of the present invention;

FIG. 5A is a detail of the cove stick shown in FIG. 5.

DESCRIPTION OF THE INVENTION

Figure 1:
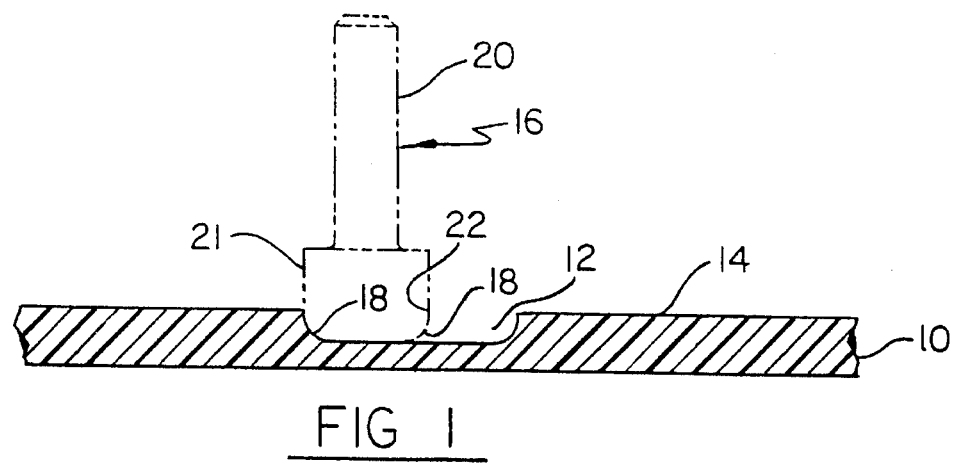
FIG. 1 illustrates the use of a router bit to form a grooved area in one surface of the backsplash material.

Referring now to FIG. 1, a solid surface polymer product 10, typically Corian®, a solid surface material, a trademark of the E. I. DuPont de Nemours Company, Wilmington, Del. for a specific solid polymer material, has a groove, or recess, 12 formed in rear surface 14. The groove 12 is formed by a grooving device, preferably a router bit 16, shown in phantom, having radiused corners 18. The thickness of polymer product 10 is variable, but typically is in the range from about 0.25 inches to about 0.75 inches. The router bit has a shaft 20, head portion 21 and a carbide or diamond tipped cutting edge 22. The normal dimensions of the router bit 16 varies depending upon the thickness of material 10. The standard height dimension of head portion 21 is 0.50 inches; the width thereof is predicated by the size of the desired radius as the finished product. For example, a 1.1875 inch width will result in a 0.50 inch inside radius 13 (see FIG. 4). The radius preferably should not exceed the maximum of one inch-large radius' interface with the horizontal area of a countertop and restrict the use of appliances. The dimension of radius 18 may vary, if necessary, to accommodate the quality of the solid surface material 10 being formed as the coved backsplash; the minimum radius 18 being approximately 0.125 inches. The radius 18 forms corresponding radius' 18' in the recess 12, the radius' 18' preferably joining rear surface 14 to the bottom surface 19 of recess 12 as illustrated. The utilization of this radius is essential to the process of the present invention.

The groove is formed in rear surface 14 by installing the cutter 16 in a portable or stationary tool such as a router or a shaper. It should be noted that different groove designs could be utilized as long as radius 18 is incorporated in the design. The overall width of the groove is the mathematical equivalent of the coved shape being formed.

The exact location of groove 12 is determined by the desired location of the bend in the finished product. The depth of groove 12 varies with the thickness of the solid surface being formed. The minimum depth is approximately 0.250 inches. The minimum thickness of material 10 is approximately 0.1875 inches. The groove is formed in order to relieve stress in material 10 created by the thermoforming process to be described hereinafter.

Figure 2:
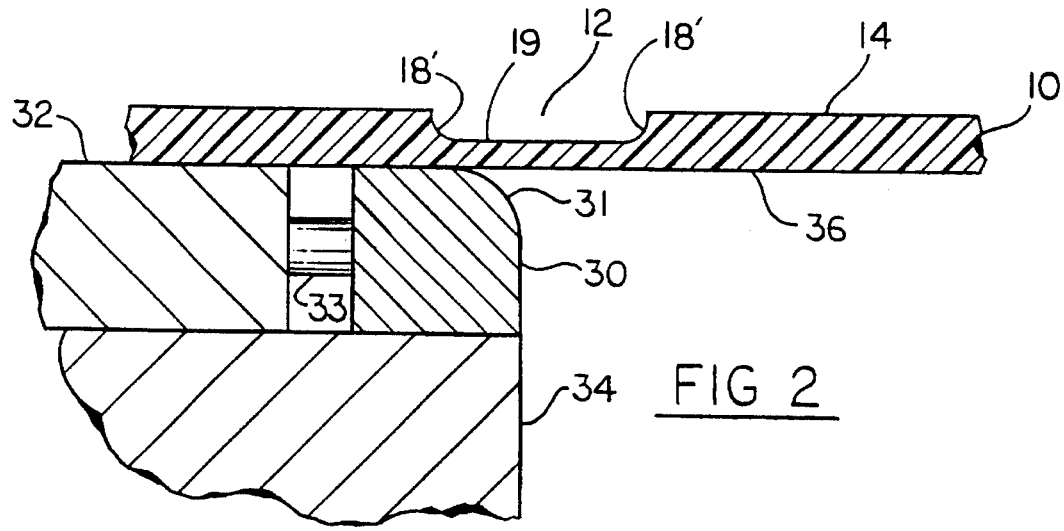
FIG. 2 illustrates the use of a heated mandrel and work bench in conjunction with the backsplash material.
Figure 3:
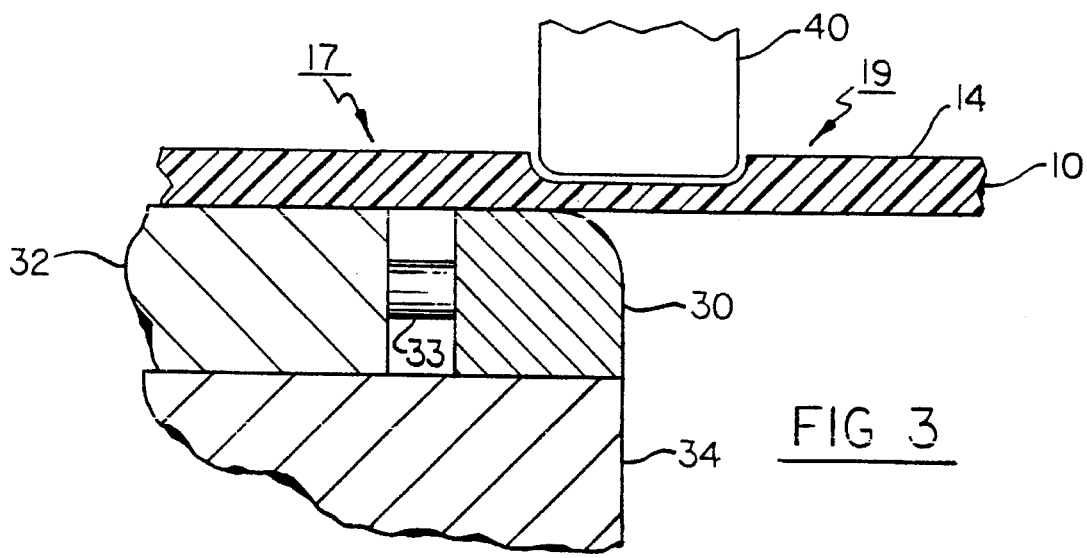
FIG. 3 illustrates a heating element positioned in the grooved area of the material.

Referring now to FIG. 2, grooved material 10 is now placed in contact with device, or mandrel, 30, the curved corner, or edge 31, of device 30 having a shape that conforms to that of the desired finished form. The device 30 is heated by a device (not shown) and should have the capacity to maintain a controlled heat, the heat being limited to the area being formed to maintain the stability of the adjacent material. The device 30 shown in the figure is a block having convex corner 31. Any convex shape having a radius can be used as a mandrel, such as a cylindrical tube, the shape of device 30 determining the width of groove 12. A work bench having portions 32 and 34, is positioned adjacent material 30, bench portion 32 being in contact with the bottom surface 36 of material 10 as illustrated. In the embodiment illustrated, the position of device 30 is adjustable by movable extension 33. In the thermoforming mode, corner 31 is positioned such that it is aligned within the area of groove 12 as illustrated.

The grooved area 12 must be heated in conjunction with the surface area being heated by the shaped mandrel 30. A controlled heating device 40, having the approximate shape as the grooved area 12, is positioned in groove 12 as illustrated, approximately 0.063 inches from the bottom surface 19 of groove 12. By having device 40 fit into groove 12, the amount of heat used to thermoform the material 10 is reduced since the heat is limited to the area being formed. This maintains the stability of the solid surface product 10 and reduces the possibility of discoloration or blistering in material 10. Device 40 is preferably a heat bar but other devices, such as infrared, radiant quartz or wire heaters may be utilized. Device 40 is heated in the range between 250° F. and 400° F. Temperatures lower than 250° F. can cause stress factors in the solid surface 10 which may result in a separation of the solid surface which causes the material 10 to break or tear. Generally, a heat temperature over 400° F. will result in a blistering or discoloration of the solid surface material 10. Device 30 is heated in the range from about 150° F. to about 300° F.

The solid surface material 10 is brought to a thermoforming temperature by conductivity of the heat generated in devices 30 and 40. A mechanical wiping arm 42 movable about pivot 43, is used to form the solid surface material to the mandrel 30 as illustrated in FIG. 4. Wiping arm 42 is secured to material 10 by various means, such as clamps, adhesives or vacuum. The solid surface material 10 is brought into tight contact with the work bench portions 32 and 34 by wiping arm 42, the lower surface area 36 being held in place by wiping arm 42 while the solid surface material 10 begins the cooling process. The wiping arm 42 pulls or pushes material 10 such that the originally aligned portions 17 and 19 of material 10 opposite the groove 12 become non-aligned. In particular, portion 19 is forced to an angle to portion 17, preferably a right angle as illustrated, to form thermoformed piece 44. When wiping arm 42 has finished its movement, the devices 30 and 40 are retracted to prevent blistering and cracking in the thermoformed area. The resultant thermoformed piece 44 is cooled at this time to approximately 165° F., wiping arm 42 also serving as a platen to maintain the flatness of material 10. In order to accomplish this, wiping arm 42 requires a flat surface 45. When the thermoformed piece 44 is cooled sufficiently, it will return to its original rigidity. A back up piece, or "cove stick", 47 is then affixed to the solid surface 10 typically with a flexible adhesive such as silicone as shown in FIG. 5. Piece 47 (detail shown in FIG. 5A) reinforces the cove section 50 and matches the thermoformed piece 44 as illustrated. The shape on the opposite or backside of piece 47 is optional except that the thickness of the material at the cove section 50 should be approximately 0.250 inches. Piece 47 can be made of material such as Corian, a solid surface material or any similar solid surface product, wood fiberboard, plywood, plastic, foam or filling compounds. The figure illustrates the thermoformed coved backsplash 44 in position adjacent perpendicular wall sections 46 and 48.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method for forming a coved backsplash from an elongated member having first and second surfaces comprising the steps of:

forming a groove in the first surface of said member, first and second portions of said member on the opposite sides of said groove being substantially coplanar;

positioning a heating device having a convex surface in contact with the second surface of said member opposite said groove and heating the elongated member to a thermoforming temperature;

positioning a heating member in said groove and heating the groove to a thermoforming temperature so that the heated elongated member can be bent;

bending said member against the convex surface of the heating device such that said first portion of said member is at an angle to said second portion of said member forming a coved section; and retracting said heating device from said second surface of said member and said heating member from said groove.

2. The method of claim 1 wherein said convex surface is aligned in position opposite said groove.

3. The method of claim 2 wherein said convex surface is positioned so that it is aligned within the area defined by said groove.

4. The method of claim 1 wherein said groove has at least one circular surface joining said first surface of said member and the bottom surface of said groove.

5. The method of claim 1 wherein said heating member is positioned above the bottom surface of said groove.

6. The method of claim 1 wherein the temperature of said heating member is in the range from about 250° F. to about 400° F.

7. The method of claim 1 including the further step of cooling said elongated member after said heating device and said heating member are retracted.

8. The method of claim 7 further including the step of affixing a member to said coved section thereby reinforcing the member.

* * * * *